US009430367B1

United States Patent
Subramanian et al.

(10) Patent No.: US 9,430,367 B1
(45) Date of Patent: Aug. 30, 2016

(54) SYSTEMS AND METHODS FOR ACTIVE RAID (75) Inventors: Srikumar Subramanian, Newark, CA (US); Senthilkumar Ramasamy, Fremont, CA (US); Loganathan Ranganathan, Fremont, CA (US); Paresh Chatterjee, Fremont, CA (US); Udita Chatterjee, legal representative, Kolkatta (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 2 days.

(21) Appl. No.: 13/450,378

(22) Filed: Apr. 18, 2012
(Under 37 CFR 1.47)

Related U.S. Application Data (60) Provisional application No. 61/476,719, filed on Apr. 18, 2011.

(51) Int. Cl.
*G06F 12/02* (2006.01)
*G06F 11/20* (2006.01)

(52) U.S. Cl.
CPC .......... *G06F 12/02* (2013.01); *G06F 11/2082* (2013.01)

(58) Field of Classification Search
CPC .......................... G06F 11/2082; G06F 3/0689
USPC ....................................................... 711/114
See application file for complete search history.

(56) References Cited

U.S. PATENT DOCUMENTS

| | | | | |
|---|---|---|---|---|
| 5,367,669 A * | 11/1994 | Holland et al. | .............. | 714/6.32 |
| 5,732,239 A * | 3/1998 | Tobagi et al. | ................. | 711/114 |
| 6,098,119 A * | 8/2000 | Surugucchi | ........... | G06F 3/0626 710/10 |
| 7,085,953 B1 * | 8/2006 | Hsu et al. | ..................... | 714/5.11 |
| 7,937,551 B2 * | 5/2011 | Schott | ................... | G06F 3/0613 711/173 |
| 8,001,352 B1 * | 8/2011 | Chatterjee et al. | ........... | 711/165 |
| 2002/0128815 A1 * | 9/2002 | Merchant | .............. | G06F 3/0605 704/2 |
| 2003/0061441 A1 * | 3/2003 | Yamamoto et al. | .......... | 711/114 |
| 2003/0237016 A1 * | 12/2003 | Johnson et al. | .................. | 714/4 |
| 2004/0230766 A1 * | 11/2004 | Cameron | ...................... | 711/203 |
| 2005/0050381 A1 * | 3/2005 | Maddock | ............ | G06F 11/1076 714/5.11 |
| 2005/0102470 A1 * | 5/2005 | Ishizaki | ........................ | 711/114 |
| 2006/0095663 A1 * | 5/2006 | Franklin | ....................... | 711/114 |

* cited by examiner

*Primary Examiner* — Adam M Queler
*Assistant Examiner* — Kenneth Tsang
(74) *Attorney, Agent, or Firm* — Meunier Carlin & Curfman LLC (57) ABSTRACT

A first RAID module is added to a first RAID controller and a second RAID module is added to a second RAID controller. An array of physical disks is partitioned into two partitions across the array of physical disks. The first partition is assigned to the first RAID module and the second partition is exposed to the second RAID module. Each of the RAID modules exposes their respective partitions to their associated RAID controller as a single array. Each RAID module further receives I/O from its respective RAID controller, and translates the I/O to access its associated partition.

18 Claims, 5 Drawing Sheets

SYSTEMS AND METHODS FOR ACTIVE RAID

CROSS-REFERENCE TO RELATED APPLICATION

The present application is a non-provisional of U.S. Provisional Patent Application No. 61/476,719, filed Apr. 18, 2011, entitled "SYSTEMS AND METHODS FOR ACTIVE RAID," which is incorporated herein by reference in its entirety.

BACKGROUND

There is an increasing need for higher resilience and availability in storage systems. One such solution is RAID along with synchronous replication between one or more storage systems. The RAID logic at the primary and secondary storage system provides protection against disk failures, and the replication between the primary and secondary storage systems protects against a total failure of the primary storage system. While such an arrangement is very popular, there are many drawbacks associated with such a system. First, duplicate copies of both the RAID hardware and the physical disks are required. Second, data center costs including foot print and energy costs are also increased.

Accordingly, the deployment of dual redundant storage servers is becoming very attractive. Here two controllers are typically housed in the same RAID enclosure and share the same set of physical disks. Thus, the RAID offers redundancy against disk failures and the duplicate set of controllers protects against loss of availability should one of the two controllers fail.

However, while such a system solves many of the problems described above, it also is associated with its own drawbacks. For example, in such systems one controller is typically the primary controller and the other is the secondary controller. The primary controller is pushed to serve all of the I/Os while the secondary controller is only used in the event of a controller failure. Thus, the secondary controller is wasted while the primary controller is overworked.

To provide better usage of both controllers, one solution is to partition the physical disks of the RAID into different volumes or volume sets. The primary controller serves a first set of volumes and the secondary controller servers a second set of volumes. In another solution, the volumes of the physical disk are used to create a virtual volume where each controller serves a different subset of the I/Os received for the virtual volume. In the event of a controller failure either of the controllers would serve the entire virtual volume.

However, in such implementations, even though both controllers are active, each controller still only works one independent set of RAID disks at a given time. For example, a first controller may work on a 7 disk RAID-5 with one hot spare, and a second controller may work on another 7 disk RAID-5 with another hot spare. As a result there is a significant waste of disk space. Continuing the example above, the 16 physical disks will only provide 12 disks of storage capacity. An optimal solution using the 16 disks would be to use a 15 disk RAID-5 with a single hot spare. However, such a solution requires distributed locking and clustering, which is very difficult to implement using two controllers.

SUMMARY

A first RAID module is added to a first RAID controller and a second RAID module is added to a second RAID controller. An array of physical disks is partitioned into two partitions across the array of physical disks. The first partition is assigned to the first RAID module and the second partition is exposed to the second RAID module. Each of the RAID modules exposes their respective partitions to their associated RAID controller as a single array. Each RAID module further receives I/O from its respective RAID controller, and translates the I/O to access its associated partition.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing improved performance in RAID system.

Figure 1:
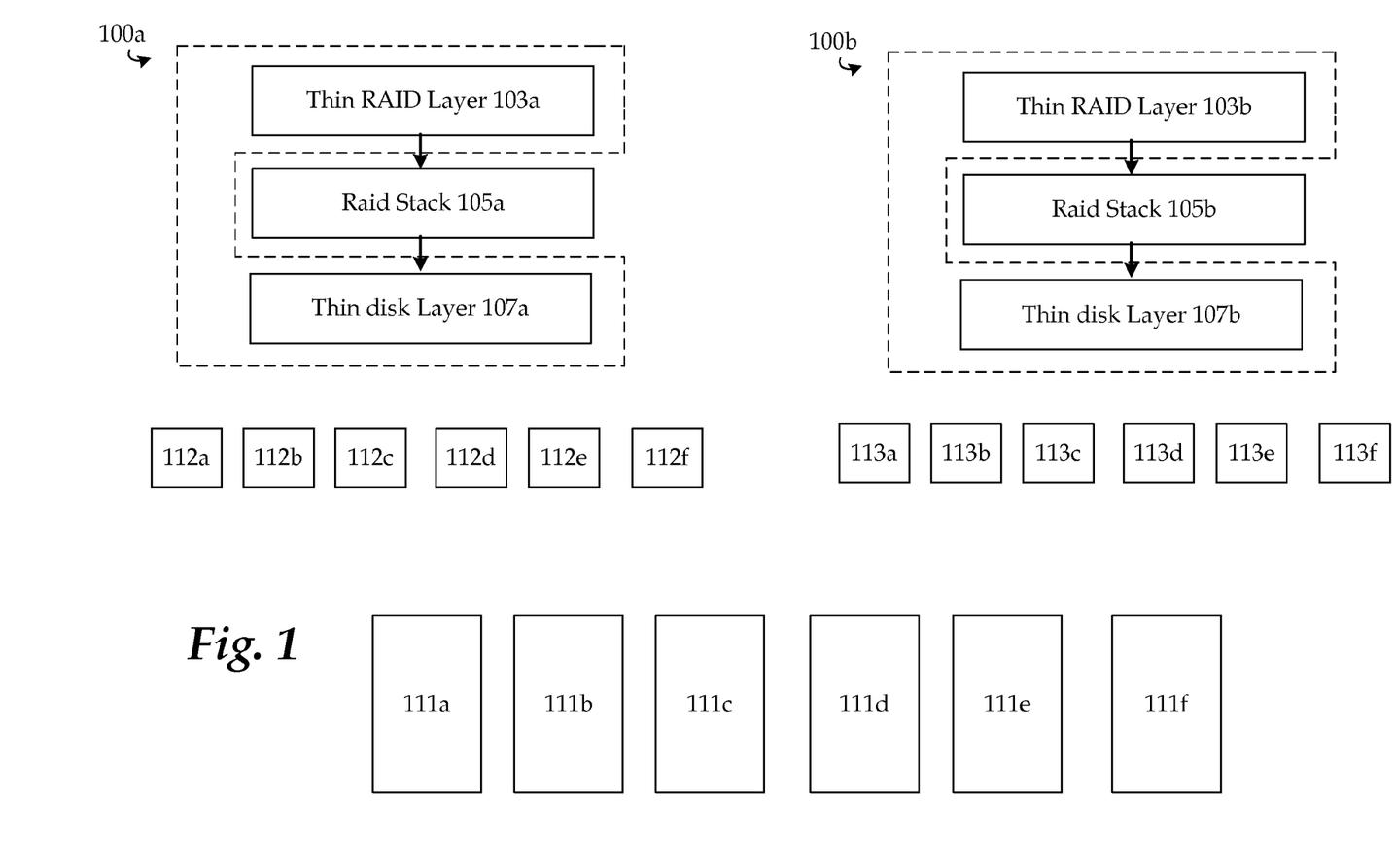
FIG. 1 is a diagram showing an illustrative operating environment for the use of a module in a RAID system.

Turning now to FIG. 1, details will be provided regarding what is referred to herein as a module 100. In particular, two module 100s (e.g., modules 100a and 100b) are illustrated. Each module 100 may be a software module and may be added to existing RAID controllers. For example, each module 100 may be a software plug-in to an existing RAID system. As shown, each module 100 may include a thin RAID layer 103, and a thin disk layer 107. However, more or fewer components may be supported.

In particular, each module 100 may act as multiple intermediate layers between a RAID stack 105 of a RAID controller and a plurality of volumes 111a, 111b, 111c, 111d, 111e, and 111f. The volumes 111a-111f may form an array. In the example shown, the volumes 111a-111e form a RAID-5 array. However, other types of RAID configurations may be used including, but not limited to, RAID-0, 1, 2, 3, 4, 6 etc. Moreover, more or fewer volumes 111a-111f may be supported. In some implementations, the volumes 111a-111f may each comprise a physical hard disk drive. Other types of volumes may be used such as network volumes, virtual volumes, and logical volumes. In some implementations, one physical hard disk may be reserved as a hot spare.

The modules 100a and 100b may be used to provide redundant active RAID support to existing RAID controllers. Each RAID stack 105 of each RAID controller may be unaware that it is part of a multi-controller array. In some implementations, the modules 100a and 100b may provide such functionality through the thin disk layers 107a and 107b.

The thin disk layers 107 may divide the available physical disk space (i.e., volumes 111a-111f into partitions or sub-volumes. The partitions may then be uniquely assigned to each of the thin disk layers 107a and 107b. The thin disk layers 107a and 107b may then expose their respective assigned partitions to their corresponding RAID stack 105 as an independent array. The thin disk layers 107a and 107b may then translate I/Os received from their corresponding RAID stack 105 to read from, or write to, their assigned partitions.

For example, the available physical space from the volumes 111a-f is portioned between the modules 100a and 100b. The thin disk layer 107a then exposes its portion of the volumes 111a-111f to the RAID stack 105a as the volumes 112a-112f. Similarly, the thin disk layer 107b exposes its portion of the volumes 111a-111f to the RAID stack 105b as the volumes 113a-113f. In some implementations, the available physical space on the volumes 111a-f is cut in half such that each of the modules 100a and 100b is assigned an equal amount of space on each volume. Thus, the volumes 112a-f and 113a-f each account for half of the volumes 111a-111f. However, other ratios or distributions of the available physical space to the modules 100 may be used.

The thin disk layers 107 of the modules 100 expose the volumes to their respective RAID stacks 105 such that the RAID stacks are unaware that they are not accessing a complete array. Accordingly, each of the thin disk layers 107 may translate I/Os sent to and received from their respective RAID stacks 105 to account for the partitioning. For example, the thin disk layer 107a may receive a write I/O to a particular offset or cluster of the volume 112a from the RAID stack 105a. The thin disk layer 107a may determine the location of the offset or cluster corresponding to the volume 112a in the volume 111a, and may process the write I/O using the determined location.

By partitioning an equal portion of each volume 111a-111f to the RAID stacks 105a and 105b, each RAID stack 105 may handle the various RAID operations and functions using its corresponding portion of each volume without knowing it is sharing a physical volume with another RAID controller. Thus, the RAID stack 105a may recover from various errors in its volumes 112a-f in the same way that it would have had it been accessing the full volumes 111a-f.

For example, in implementations where the volume 111f is used for parity for the volumes 111a-e, the RAID stack 105a may similarly use the volume 112f as parity to the volumes 112a-e. If a bad block error is received for the volume 112a, the RAID stack 105a will recover from the bad block error using data from the other volumes 112b-e and the parity data from the volume 112f.

Figure 2:
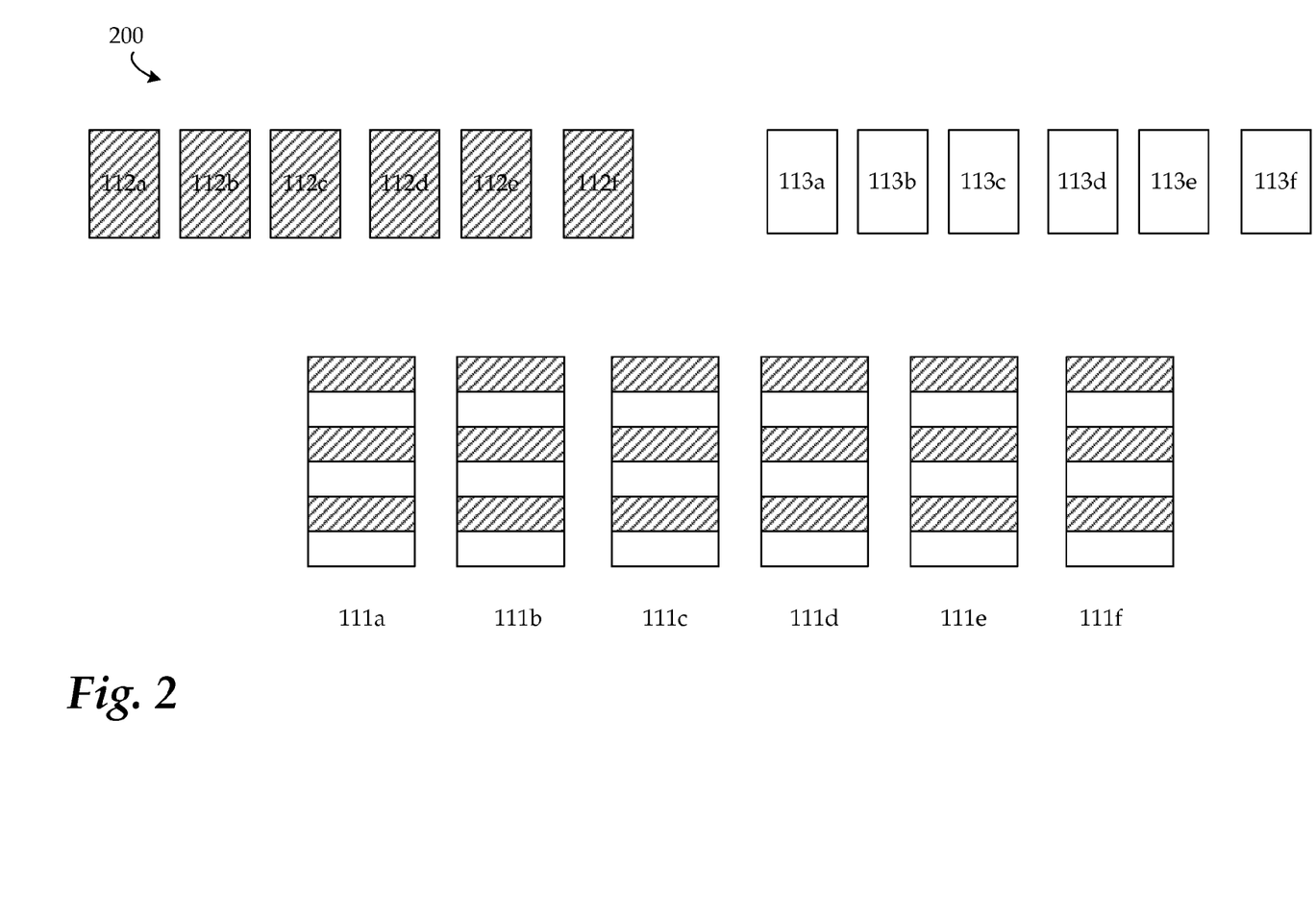
FIG. 2 is a flow diagram showing an example configuration for partitioning volumes of an array of physical disks.

FIG. 2 is an illustration of example configuration 200 for partitioning the volumes 111a-111f. In the example shown, each of the volumes 111a-111f have been divided into stripes of equal size, and sequentially divided among the volumes 112a-f and the volumes 113a-f. The stripes assigned to the volumes 112a-f are shown using the hashed lines and the stripes assigned to the volumes 113a-f are shown with no hashed lines. As shown, each of the volumes 112a-f and 113a-f have received the same number of stripes.

Figure 3:
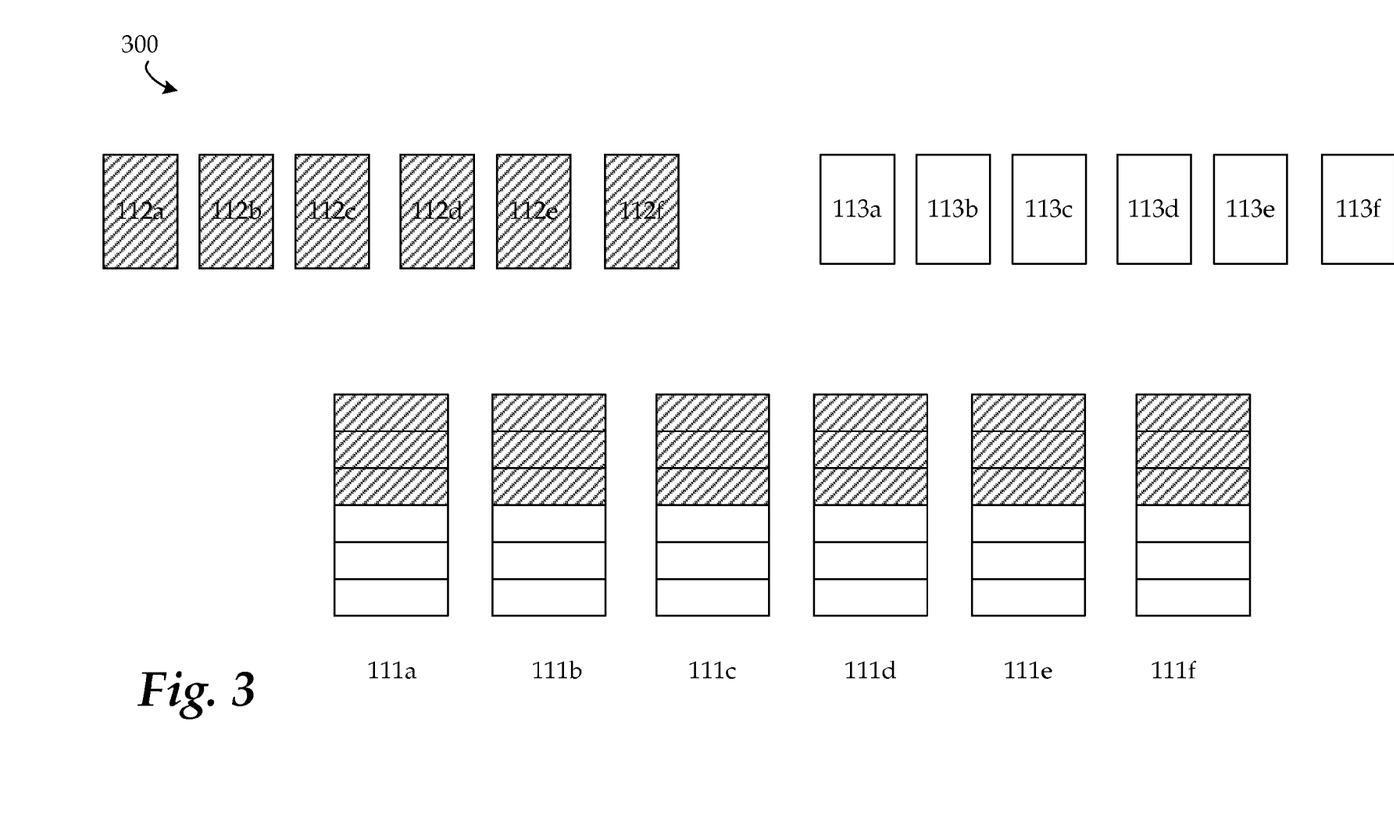
FIG. 3 is a flow diagram showing an example configuration for partitioning volumes of an array of physical disks.

FIG. 3 is an illustration of another example configuration 300 for partitioning the volumes 111a-f. In the example shown, each of the volumes 111a-111f have been divided in half. The top portions of the volumes 111a-111f are shown using hashed lines and have been assigned to the volumes 112a-f. The bottom portions of the volumes 111a-111f are shown without hashed lines and have been assigned to the volumes 113a-f.

While both the configurations 200 and 300 may be used by the modules 200 and 300, there may be one or more advantages to using the alternating stripes of the configuration 200. One advantage may be to reduce the overall seek times and head thrash for the volumes 111a-f. For example, in many implementations, the arrays comprised of the volumes 112a-f and 113a-f may be exposed to one or more users as a single striped virtual volume. Data written to a region of the volumes 112a-f will likely be followed by data being written to a subsequent region of the volumes 113a-f. Thus, by alternating the stripes of the volumes 111a-f assigned to the volumes 112a-f and 113a-f, the overall head movement of the physical disks may be reduced because the writes and reads may be made to sequential stripes of the volumes 111a-f.

Still another advantage of the configuration 200 is the equitable distribution of the physical space with respect to drive performance. It is well known that outer portions of physical disks provide superior performance over inner portions of the physical disks. Thus, in the configuration 300, one of the modules 100a or 100b is likely to receive mostly poor performing regions of the disks, while the other is likely to receive mostly high performing regions. Accordingly, the configuration 200 provides a more equitable distribution of the portions of the physical disks with respect to disk performance.

The modules 100 may also be used to easily replace failed disks of the volumes 111a-111f. For example, assume that the volume 111b fails and is replaced. A new volume 111b may be added to the volumes 111a-111f, and may be partitioned by the thin disk layers 107a and 107b and exposed as the volumes 112b and 113b. For example, a hot spare may be provided that replaces a failed volume. Each of the RAID stacks 105a and 105b may then rebuild their corresponding volumes 112b and 113b as normal using the data on the volumes 112a and 112c-f, and 113a and 113c-f respectively.

Figure 4:
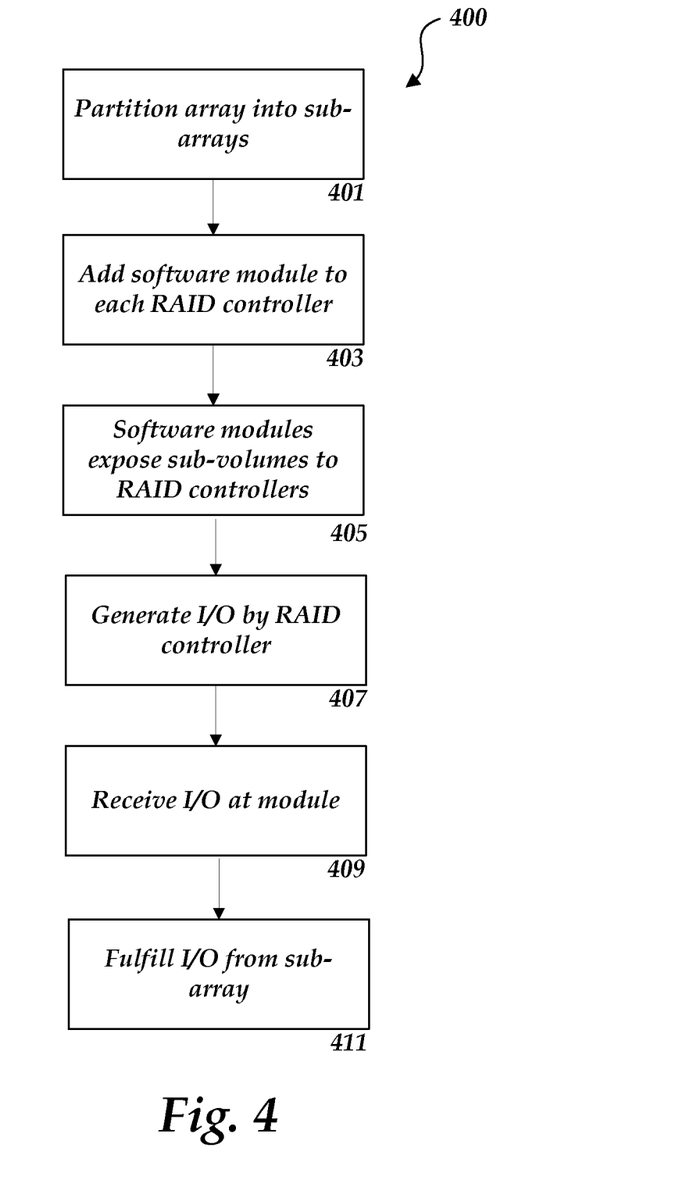
FIG. 4 is a flow diagram showing an illustrative routine for use of a RAID module.

FIG. 4 shows a diagram of an operational flow of a method 400 for an implementing an active/active RAID using a pair of modules 100. At operation 401, an array of physical disks is partitioned into two sub-arrays. In some implementations, each sub-array may include the same number of volumes as physical disks in the array of physical disks. For example, if the array has six physical disks, then each sub-array may have six volumes. Moreover, each physical disk of the array may be equally divided among the corresponding volumes in the sub-array.

At operation 403, a module 100 is added to each RAID controller. In some implementations, each module 100 may be a software plug-in to an existing RAID controller. Each module 100 may include a thin disk layer 107. The thin disk layer 107 may receive I/O requests made between a RAID stack and the physical array of disks.

At operation 405, each thin disk layer 107 exposes the volumes of a sub-array to the RAID stack 105 of their corresponding RAID controller. Each RAID stack 105 may be unaware that the volumes of its corresponding sub-array are part of a physical disk array.

At operation 407, an I/O is generated by a RAID controller for a volume of a sub-array. At operation 409, the thin disk layer 107 corresponding to the RAID controller receives the generated I/O. At 411, the thin disk layer 107 determines a location in the physical array of disks that corresponds to the received I/O, and fulfills the I/O at the determined location.

Figure 5:
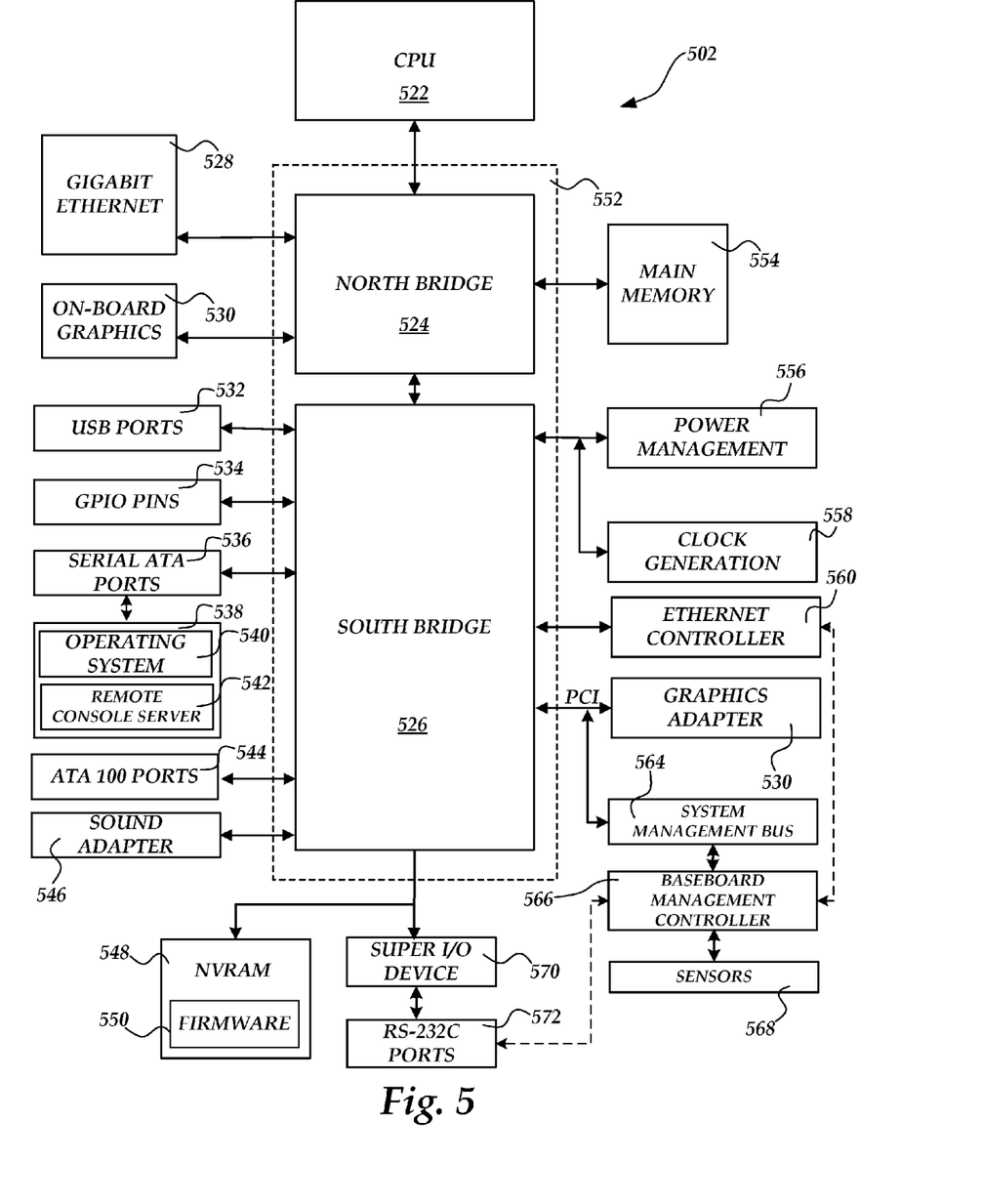
FIG. 5 is a computer architecture diagram showing an illustrative computer hardware architecture for a storage node computing system capable of implementing aspects of the embodiments presented herein.

FIG. 5 shows an illustrative computer architecture for a computer 500 capable of executing the software components described herein. In particular, the computer architecture shown in FIG. 5 provides a simplified view of the architecture of a conventional computer.

FIG. 5 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The server computer 502 includes a baseboard, or "motherboard", which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 6522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 624 is connected to the south bridge 526.

The south bridge 526 is responsible for controlling many of the input/output functions of the computer 502. In particular, the south bridge 526 may provide one or more universal serial bus ("USB") ports 532, a sound adapter 546, an Ethernet controller 560, and one or more general purpose input/output ("GPIO") pins 534. The south bridge 526 may also provide a bus for interfacing peripheral card devices such as a graphics adapter 562. In one embodiment, the bus comprises a peripheral component interconnect ("PCI") bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more serial ATA ports 536 and an ATA 100 adapter for providing one or more ATA 100 ports 544. The serial ATA ports 536 and the ATA 100 ports 544 may be, in turn, connected to one or more mass storage devices storing an operating system 540 and application programs, such as the SATA disk drive 538. As known to those skilled in the art, an operating system 540 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 540 comprises the LINUX operating system. According to another embodiment of the invention the operating system 540 comprises the WINDOWS SERVER operating system from MICROSOFT CORPORATION. According to another embodiment, the operating system 540 comprises the UNIX or SOLARIS operating system. It should be appreciated that other operating systems may also be utilized.

The mass storage devices connected to the south bridge 526, and their associated computer-readable media, provide non-volatile storage for the computer 502. Although the description of computer-readable media contained herein refers to a mass storage device, such as a hard disk or CD-ROM drive, it should be appreciated by those skilled in the art that computer-readable media can be any available media that can be accessed by the computer 502. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices for measuring various operating and performance-related parameters within the computer system 502. The sensor devices may be either hardware or software based components configured or programmed to measure or detect one or more of the various operating and performance-related parameters. The BMC 566 functions as the master on the management bus 564 in most circumstances, but may also function as either a master or a slave in other circumstances. Each of the various components communicatively connected to the BMC 566 by way of the management bus 564 is addressed using a slave address. The management bus 564 is used by the BMC 566 to request and/or receive various operating and performance-related parameters from one or more components, which are also communicatively connected to the management bus 564.

It should be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

Based on the foregoing, it should be appreciated that technologies for providing networked RAID in a virtualized storage cluster are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method of providing an active/active clustered redundant array of inexpensive disks (RAID), comprising:
    partitioning an array of physical disks into a volume comprising at least two sub-volumes, wherein each physical disk of the array is divided among each of the at least two sub-volumes;
    providing a first RAID controller and a second RAID controller, a first RAID stack of the first RAID controller and a second RAID stack of the second RAID controller being unaware that they are part of a multi-controller array, wherein the first RAID controller and the second RAID controller share the physical disks that comprise the volume;
    providing a module within the first RAID controller and the second RAID controller that exposes a first sub-volume of the volume to the first RAID stack and a second sub-volume of the volume to the second RAID stack;
    generating an input/output (I/O) request by one of the first RAID controller or the second RAID controller;
    receiving the I/O request at the module associated with the one of the first RAID controller or the second RAID controller;
    determining a physical location within the array of physical disks that corresponds to the I/O request; and
    fulfilling the I/O request at the physical location, wherein the first RAID controller and the second RAID controller are configurable to implement a different RAID level in the first and second sub-volumes of the volume, respectively.

2. The method of claim 1, further comprising providing each of the sub-volumes with a same number of physical disks as in the array of physical disks.

3. The method of claim 1, wherein each physical disk is divided into stripes of equal size, and sequentially divided among the first sub-volume and the second sub-volume.

4. The method of claim 1, wherein each physical disk is divided in half, wherein a top half is assigned to the first sub-volume, and wherein a bottom half is assigned to the second sub-volume.

5. The method of claim 1, further comprising providing a physical hot spare disk, wherein the physical hot spare disk is divided among the sub-volumes.

6. The method of claim 1, wherein the module comprises plural layers, wherein a thin disk layer receives I/O requests made between a RAID stack and the array of physical disks and wherein the thin disk layer determines the physical location.

7. The method of claim 1, wherein the first RAID controller and the second RAID controller concurrently serve I/O requests for the at least two sub-volumes.

8. The method of claim 7, wherein the I/O requests are made to all physical disks in the volume.

9. A data storage system, comprising:
    a storage server;
    a physical storage device associated with storage server;
    a processing unit associated with the storage server; and
    one or more modules for execution on the processing unit, operable to partition an array of physical disks into a volume comprising at least two sub-volumes, wherein each physical disk of the array is divided among each of the at least two sub-volumes, provide a first RAID controller and a second RAID controller, provide a module within the first RAID controller and the second RAID controller that exposes a first sub-volume of the volume to a first RAID stack of the first RAID controller and a second sub-volume of the volume to a second RAID stack of the second RAID controller, generate an input/output (I/O) request by one of the first RAID controller or the second RAID controller, receive the I/O request at the module associated with the one of the first RAID controller or the second RAID controller, determine a physical location within the array of physical disks that corresponds to the I/O request, and fulfill the I/O request at the physical location, wherein the first RAID stack and the second RAID stack are unaware that they are part of a multi-controller array, and the first RAID controller and the second RAID controller share the physical disks that comprise the volume, and wherein the first RAID controller and the second RAID controller are configurable to implement a different RAID level in the first and second sub-volumes of the volume, respectively.

10. The data storage system of claim 9, wherein each of the sub-volumes are provided with a same number of physical disks as in the array of physical disks.

11. The data storage system of claim 9, wherein each physical disk is divided into stripes of equal size, and sequentially divided among the first sub-volume and the second sub-volume.

12. The data storage system of claim 9, wherein each physical disk is divided in half, wherein a top half is assigned to the first sub-volume, and wherein a bottom half is assigned to the second sub-volume.

13. The data storage system of claim 9, further comprising a physical hot spare disk, wherein the physical hot spare disk is divided among the sub-volumes.

14. The data storage system of claim 9, wherein the module comprises plural layers, wherein a thin disk layer receives I/O requests made between a RAID stack and the array of physical disks and wherein the thin disk layer determines the physical location.

15. The data storage system of claim 9, wherein the first RAID controller and the second RAID controller concurrently serve I/O requests for the at least two sub-volumes.

16. The data storage system of claim 15, wherein the I/O requests are made to all physical disks in the volume.

17. A non-transitory computer storage medium having computer-executable instructions stored thereon which, when executed by a computer system, cause the computer system to:

partition an array of physical disks into a volume comprising at least two sub-volumes, wherein each physical disk of the array is divided among each of the at least two sub-volumes;

provide a first RAID controller and a second RAID controller, a first RAID stack of the first RAID controller and a second RAID stack of the second RAID controller being unaware that they are part of a multi-controller array, wherein the first RAID controller and the second RAID controller share the physical disks that comprise the volume;

provide a module within the first RAID controller and the second RAID controller that exposes a first sub-volume of the volume to the first RAID stack and a second sub-volume of the volume to the second RAID stack;

generate an input/output (I/O) request by one of the first RAID controller or the second RAID controller;

receive the I/O request at the module associated with the one of the first RAID controller or the second RAID controller;

determine a physical location within the array of physical disks that corresponds to the I/O request; and fulfill the I/O request at the physical location, wherein the first RAID controller and the second RAID controller are configurable to implement a different RAID level in the first and second sub-volumes of the volume, respectively.

18. The non-transitory computer storage medium of claim 17, wherein the module comprises plural layers, wherein a thin disk layer receives I/O requests made between a RAID stack and the array of physical disks, and wherein the thin disk layer further comprising instructions to determine the physical location.

* * * * *